(12) United States Patent
Pande et al.

(10) Patent No.: US 11,855,886 B2
(45) Date of Patent: *Dec. 26, 2023

(54) SYSTEMS AND METHODS FOR APPLYING SD-WAN POLICIES TO ROUTER-GENERATED TRAFFIC

(71) Applicant: Cisco Technology, Inc., San Jose, CA (US)

(72) Inventors: Vinay Jayant Pande, Sunnyvale, CA (US); Rong Wang, Pleasanton, CA (US); Deependra Vidyadhar Vaidya, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,926

(22) Filed: Feb. 28, 2022

(65) Prior Publication Data

US 2022/0191137 A1    Jun. 16, 2022

Related U.S. Application Data

(63) Continuation of application No. 16/743,122, filed on Jan. 15, 2020, now Pat. No. 11,265,242.

(51) Int. Cl.
*H04L 45/52*    (2022.01)
*H04L 45/302*    (2022.01)
*H04L 69/08*    (2022.01)

(52) U.S. Cl.
CPC .......... *H04L 45/52* (2013.01); *H04L 45/3065* (2013.01); *H04L 69/08* (2013.01)

(58) Field of Classification Search
CPC ...... H04L 45/52; H04L 45/3065; H04L 69/08
See application file for complete search history.

(56) References Cited

U.S. PATENT DOCUMENTS

| 7,466,810 | B1 | 12/2008 | Quon et al. |
| 10,200,274 | B1* | 2/2019 | Suryanarayana ....... H04L 45/02 |
| 11,604,705 | B2* | 3/2023 | Mehta ................... G06F 16/273 |

(Continued)

FOREIGN PATENT DOCUMENTS

| CN | 104243317 A | 12/2014 |
| CN | 107113899 A | 8/2017 |

(Continued)

OTHER PUBLICATIONS

Patent Cooperation Treaty, International Search Report and Written Opinion, International Application No. PCT/US2021/012175, dated Mar. 24, 2021, 34 pages.

(Continued)

*Primary Examiner* — Samina F Choudhry
(74) *Attorney, Agent, or Firm* — Baker Botts L.L.P.

(57) ABSTRACT

In one embodiment, a method includes receiving non-Internet Protocol (IP) traffic from one or more non-IP traffic sources. The method also includes terminating the non-IP traffic and re-originating the non-IP traffic as first IP traffic in accordance with one or more software-defined networking in a wide area network (SD-WAN) protocols. The method further includes communicating the first IP traffic to an SD-WAN link in accordance with one or more SD-WAN policies.

20 Claims, 4 Drawing Sheets

(56) References Cited

U.S. PATENT DOCUMENTS

| | | | |
|---|---|---|---|
| 2007/0047446 A1* | 3/2007 | Dalal | H04L 45/22 |
| | | | 370/237 |
| 2008/0008142 A1* | 1/2008 | Aldaz | H04L 69/12 |
| | | | 370/352 |
| 2012/0191842 A1 | 7/2012 | Hu et al. | |
| 2019/0158605 A1 | 5/2019 | Markuze et al. | |
| 2019/0199597 A1 | 6/2019 | Valisammagari et al. | |
| 2019/0215188 A1 | 7/2019 | Ethier et al. | |
| 2019/0386954 A1* | 12/2019 | Lau | H04L 61/2503 |

FOREIGN PATENT DOCUMENTS

| | | |
|---|---|---|
| CN | 110178342 A | 8/2019 |
| JP | 2012049883 A | 3/2012 |
| WO | 2017173098 A1 | 10/2017 |
| WO | 2019027833 A1 | 2/2019 |

OTHER PUBLICATIONS

Ma X., "Analysis of Implementation of SD-WAN Technology from Dilemma of Traditional Routing Protocols", Electronic Technology Software Engineering, 9 pages.

Office Action for Chinese Application No. 202180009458.1, dated Aug. 29, 2023, 22 Pages.

Office Action for Japanese Application No. 2022542722, dated Oct. 11, 2023, 16 Pages.

Utahara T., "A Study of Virtualized SBC", The Institute of Electronics, Information and Communication Engineers, IEICE Technical Report, vol. 114, No. 477, Japan, Feb. 23, 2015, 7 Pages.

* cited by examiner

SYSTEMS AND METHODS FOR APPLYING SD-WAN POLICIES TO ROUTER-GENERATED TRAFFIC

PRIORITY

This application is a continuation under 35 U.S.C. § 120 of U.S. patent application Ser. No. 16/743,122 filed Jan. 15, 2020, which is a utility filing entitled "SYSTEMS AND METHODS FOR APPLYING SD-WAN POLICIES TO ROUTER-GENERATED TRAFFIC," which is hereby incorporated by reference in its entirety.

TECHNICAL FIELD

This disclosure generally relates to applying policies to traffic, and more specifically to systems and methods for applying software-defined networking in a wide area network (SD-WAN) policies to router-generated traffic.

BACKGROUND

Currently, SD-WAN policies are only be applied to IP traffic that is transiting through an SD-WAN router (i.e., traffic that enters the SD-WAN router as IP traffic and exits the SD-WAN router as IP traffic). IP traffic coming in from a local area network (LAN) side of an SD-WAN router transits through the SD-WAN router and is sent over to a WAN as IP traffic. Non-IP traffic cannot transit over the SD-WAN in its current form and must be transitioned to IP traffic.

DESCRIPTION OF EXAMPLE EMBODIMENTS

Overview

Figure 1:
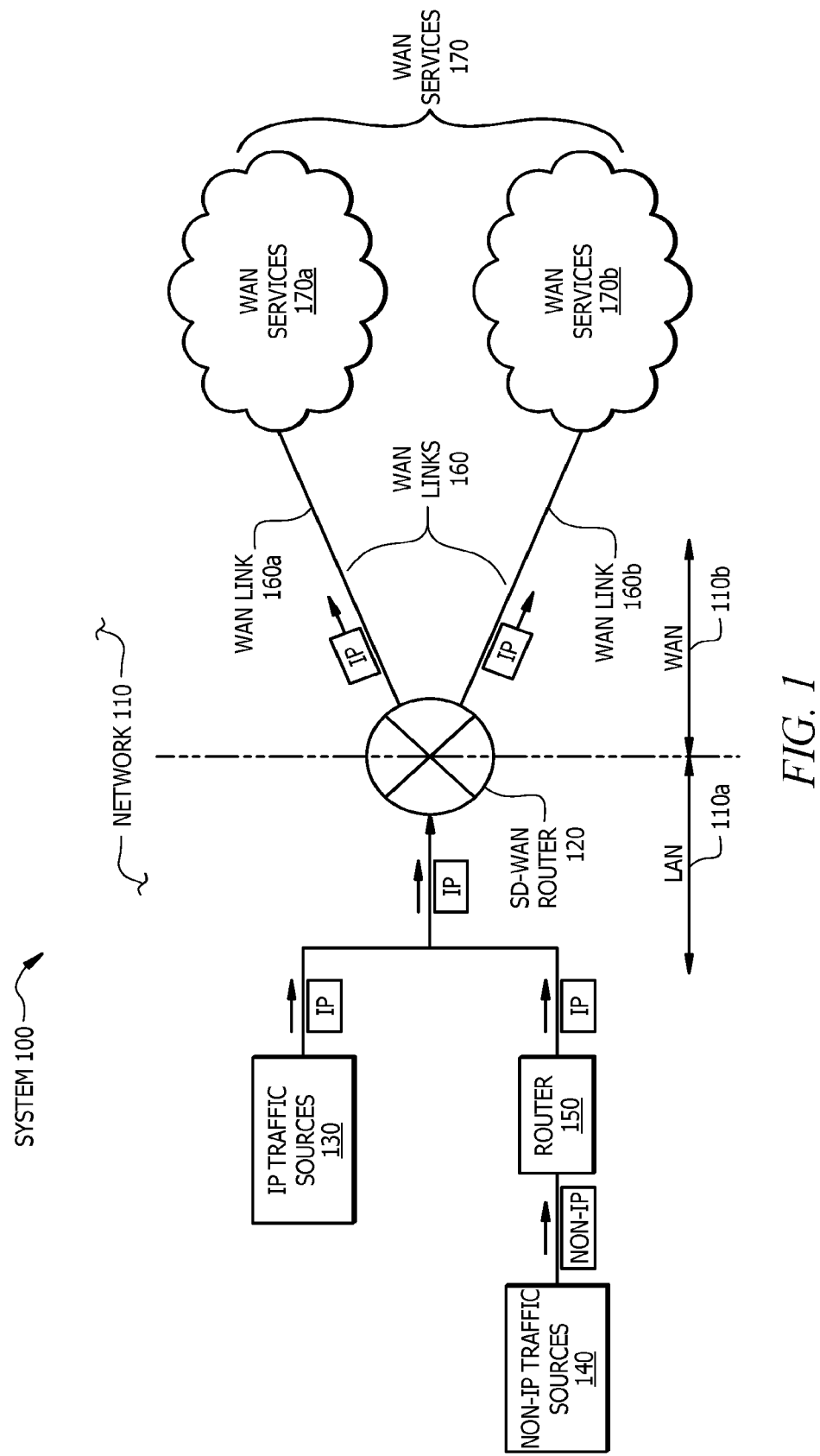
FIG. 1 illustrates an example system for applying SD-WAN policies to incoming IP traffic.

According to an embodiment, a router includes one or more processors and one or more computer-readable non-transitory storage media coupled to the one or more processors. The one or more computer-readable non-transitory storage media include instructions that, when executed by the one or more processors, cause the router to perform operations including receiving non-Internet Protocol (IP) traffic from one or more non-IP traffic sources. The operations also include terminating the non-IP traffic and re-originating the non-IP traffic as first IP traffic in accordance with one or more SD-WAN protocols. The operations further include communicating the first IP traffic to an SD-WAN link in accordance with one or more SD-WAN policies.

In certain embodiments, the operations may include receiving IP traffic from one or more IP traffic sources. The operations may also include terminating the IP traffic and re-originating the IP traffic as second IP traffic in accordance with one or more SD-WAN protocols. The operations may further include performing Session Border Controller (SBC) functions on the second IP traffic and communicating the second IP traffic to an SD-WAN link in accordance with one or more SD-WAN policies.

In some embodiments, the operations may include receiving IP traffic from one or more IP traffic sources and communicating the IP traffic to an SD-WAN link in accordance with one or more SD-WAN policies. In certain embodiments, the operations may include receiving IP traffic from one or more IP traffic sources, terminating the IP traffic, re-originating the IP traffic as re-originated non-IP traffic in accordance with one or more legacy protocols, and communicating the re-originated non-IP traffic to a legacy network.

The one or more SD-WAN protocols may include at least one of the following: Session Initiation Protocol (SIP), Real-Time Transport Protocol (RTP), and Real-Time Transport Control Protocol (RTCP). The one or more SD-WAN policies may include at least one of the following: Forward Error Correction (FEC) and Application Quality of Experience (APPQoE). The one or more non-IP traffic sources may be associated with one or more of the following interfaces: a time-division multiplex (TDM) interface, a foreign exchange subscriber (FXS) interface, a foreign exchange office (FXO) interface, a T1 interface, an E1 interface, and a digital signal processor (DSP) interface.

According to another embodiment, a method includes receiving non-IP traffic from one or more non-IP traffic sources. The method also includes terminating the non-IP traffic and re-originating the non-IP traffic as first IP traffic in accordance with one or more SD-WAN protocols. The method further includes communicating the first IP traffic to an SD-WAN link in accordance with one or more SD-WAN policies.

According to yet another embodiment, one or more computer-readable non-transitory storage media embody instructions that, when executed by a processor, cause the processor to perform operations including receiving non-IP traffic from one or more non-IP traffic sources. The operations also include terminating the non-IP traffic and re-originating the non-IP traffic as first IP traffic in accordance with one or more SD-WAN protocols. The operations further include communicating the first IP traffic to an SD-WAN link in accordance with one or more SD-WAN policies.

Technical advantages of certain embodiments of this disclosure may include one or more of the following. Embodiments of this disclosure use native services at a single router (e.g., a branch router) to terminate non-IP traffic, re-originate the terminated non-IP traffic as IP traffic, determine an appropriate SD-WAN link through which the re-originated IP traffic should be transported, and/or apply policies to the traffic, which may create operational advantages and cost efficiencies. For example, the branch router may have a smaller overall footprint (physically or virtually). In certain embodiments, support and troubleshooting the network may be simplified since no third-party technology is used. Optimizations based on the type of traffic may be determined at a more granular level by the router since the router is exposed to both non-IP and IP traffic as opposed to the router only being exposed to IP traffic.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for applying SD-WAN policies to router-generated traffic. Traffic may come enter an SD-WAN router over non-IP interfaces and exit the SD-WAN router over WAN links using a unified communication (UC) protocol. This non-IP traffic cannot transit over the SD-WAN in its current form and must be transitioned to IP traffic. At some point, the non-IP traffic must be terminated and re-originated. In such cases, traffic is not "transiting" through the SD-WAN router. Rather, the traffic is "generated" by the SD-WAN router. Traditionally, no SD-WAN vendor can apply SD-WAN policies for such "re-originated" traffic. This disclosure proposes systems and methods for applying SD-WAN policies, such as FEC policies, to router-generated traffic.

Figure 2:
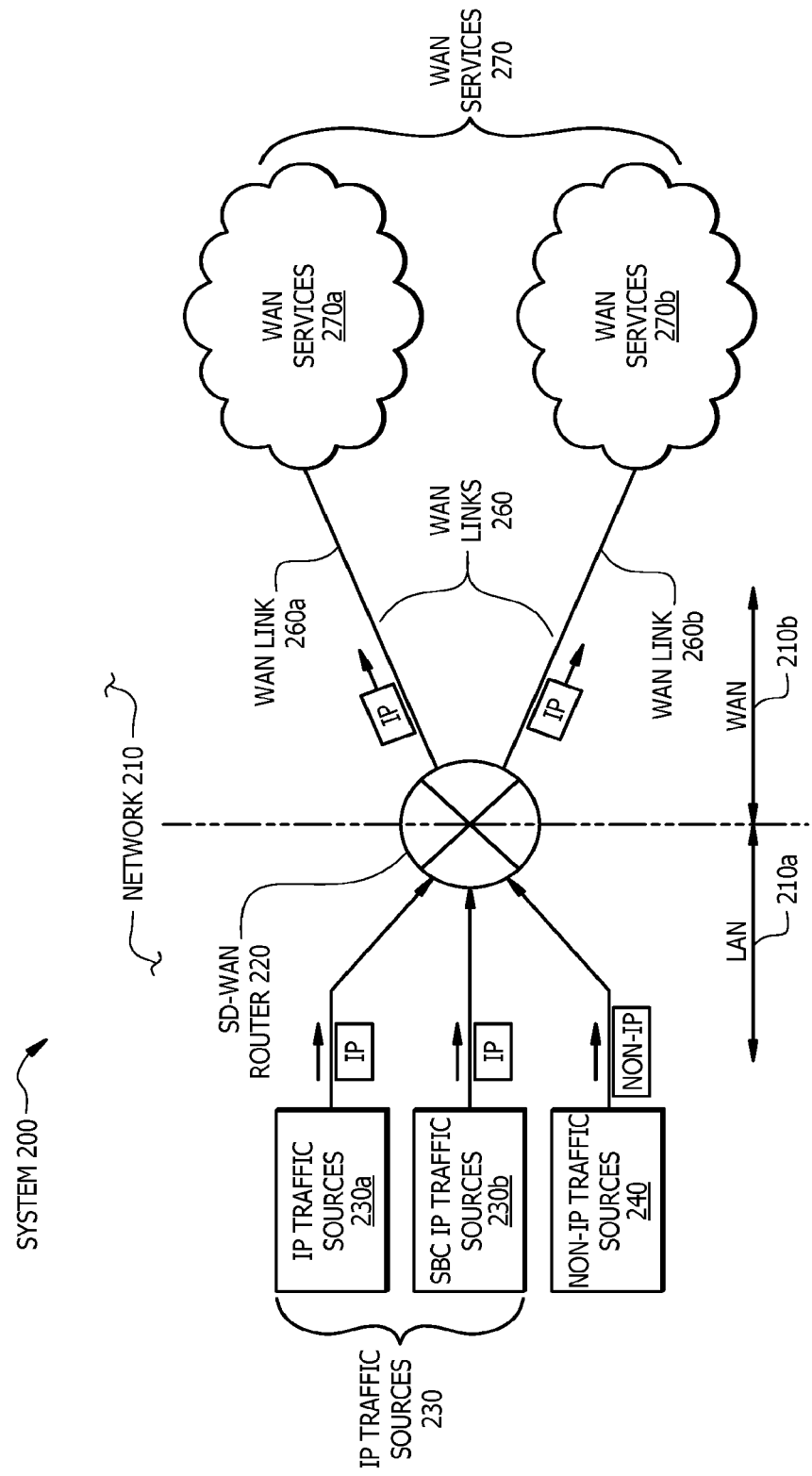
FIG. 2 illustrates an example system for applying SD-WAN policies to router-generated traffic.
Figure 3:
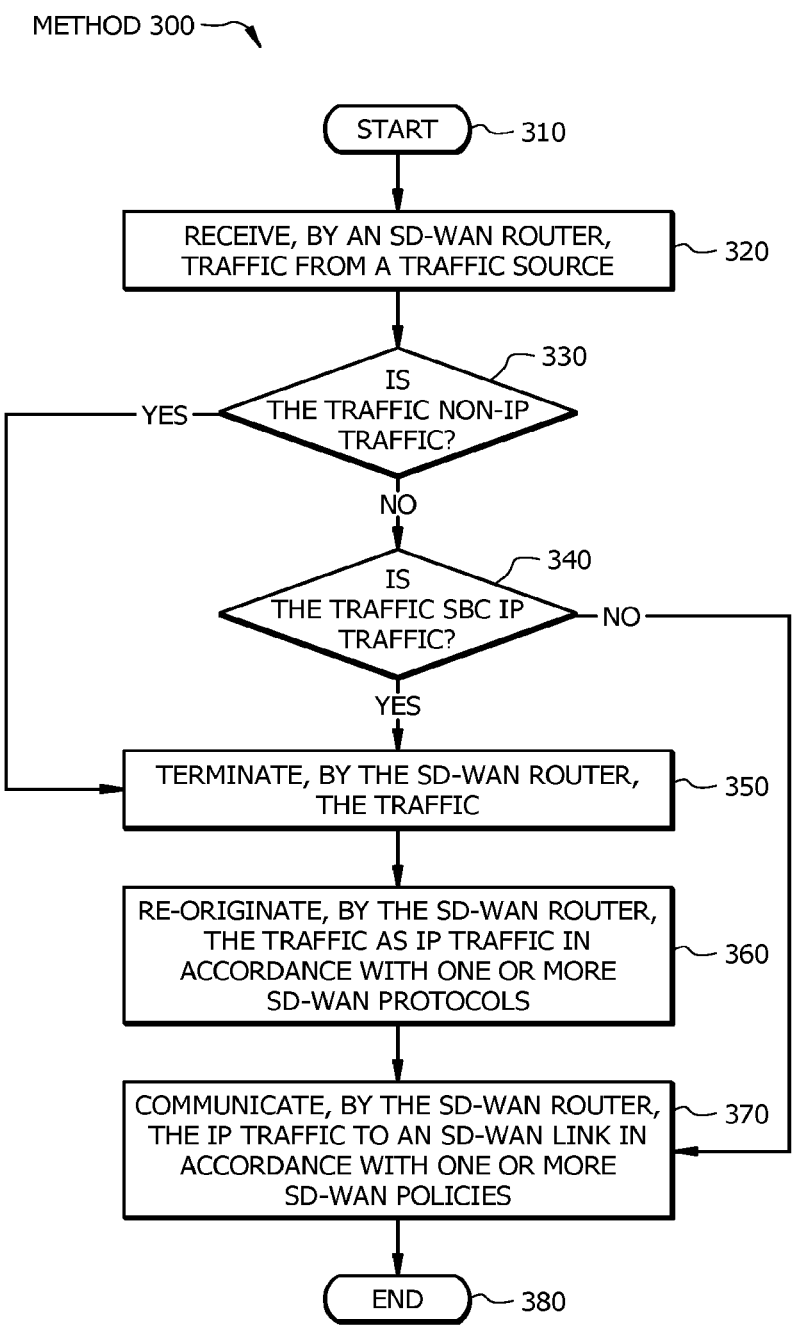
FIG. 3 illustrates an example method for applying SD-WAN policies to router-generated traffic.
Figure 4:
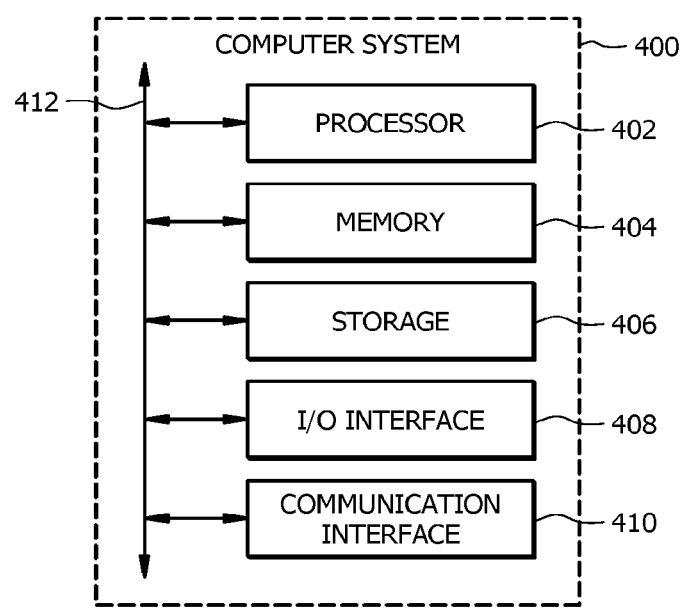
FIG. 4 illustrates an example computer system that may be used by the systems and methods described herein.

FIG. 1 shows an example system for applying SD-WAN policies to incoming traffic, and FIG. 2 shows an example system for applying SD-WAN policies to router-generated traffic. FIG. 3 shows an example method for applying SD-WAN policies to router-generated traffic. FIG. 4 shows an example computer system that may be used by the systems and methods described herein.

FIG. 1 illustrates an example system 100 for applying SD-WAN policies to incoming IP traffic. System 100 or portions thereof may be associated with an entity, which may include any entity, such as a business or company (e.g., a service provider) that applies SD-WAN policies to incoming traffic. The components of system 100 may include any suitable combination of hardware, firmware, and software. For example, the components of system 100 may use one or more elements of the computer system of FIG. 4. System 100 includes network 110, SD-WAN router 120, IP traffic sources 130, non-IP traffic sources 140, router 150, WAN links 160, and WAN services 170.

Network 110 of system 100 facilitates communication between components of system 100. For example, network 110 of system 100 may connect one or more components (e.g., SD-WAN router 120, IP traffic sources 130, non-IP traffic sources 140, router 150, and services 170) of system 100. Network 110 includes a LAN 110a and a WAN 110b. LAN 110a includes IP traffic sources 130, non-IP traffic sources 140, and router 150. WAN 110b includes WAN links 160 and WAN services 170. LAN 110a and/or WAN 110b may include one or more branch offices, data centers, corporate offices, and the like. WAN links 160 are connections between SD-WAN router 120 and WAN services 170. WAN services 170 may be associated with one or more applications that provide services to users (e.g., subscribers) such as video streaming, load balancing, security, retail, social media, telecommunication, gaming, banking, and the like.

While FIG. 1 illustrates certain types of networks 110, this disclosure contemplates any suitable network 110. One or more portions of network 110 may include an ad-hoc network, an intranet, an extranet, a virtual private network (VPN), a wireless LAN (WLAN), a wireless WAN (WWAN), a metropolitan area network (MAN), a portion of the Internet, a portion of the Public Switched Telephone Network (PSTN), an LTE network, a cellular telephone network, a combination of two or more of these, or other suitable types of networks 110. One or more portions of network 110 may be a communications network, such as a private network, a public network, a connection through Internet, a mobile network, a WI-FI network, a cloud network, etc. Network 110 may include a core network (e.g., a 4G and/or 5G network), an access network, an edge network, an internet service provider (ISP) network, a network service provider (NSP) network, an aggregation network, and the like. Network 110 may implement SD-WAN technology. SD-WAN is a specific application of software defined networking technology applied to WAN connections (e.g., broadband Internet, 4G, 5G, LTE, Multiprotocol Label Switching (MPLS), etc.).

SD-WAN router 120 of system 100 is a network component that analyzes data being sent across network 110, determines routes for the data to travel network 110 based on the analysis, and communicates the data in accordance with the determined routes. SD-WAN router 120 is used to connect multiple networks together (e.g., LAN 110a and WAN 110b). SD-WAN router 120 may be a virtual router or a physical router. SD-WAN router 120 may be a branch router. SD-WAN router 120 of system 100 receives traffic from LAN 110a and determines an appropriate path through WAN 110b to route the incoming traffic.

IP traffic sources 130 and non-IP traffic sources 140 of LAN 110a provide input to SD-WAN router 120. IP traffic sources 130 include any sources that generate IP traffic. IP traffic is network traffic that is based on the IP (TCP/IP) protocol. IP traffic sources 130 may include devices such as phones (e.g., smartphones), laptop computers, desktop computers, tablets, personal digital assistants, wearables (e.g., smartwatches, fitness trackers, etc.), and the like. IP traffic sources 130 may include one or more applications. The applications may include word processing software, spreadsheet software, presentation software, production software, database software, time management software, multimedia software, enterprise software, simulation software, educational software, content access software, web browser software, and the like. IP traffic sources 130 generate IP traffic that is forwarded to SD-WAN router 120.

Prior to the IP traffic reaching SD-WAN router 120 (or when the IP traffic is within SD-WAN router 120), one or more components of system 100 may associate the IP traffic with an application. For example, SD-WAN router 120 may perform network-based application recognition (NBAR) to identify the application. In certain embodiments, NBAR detects whether the IP traffic matches a signature associated with a particular application (e.g., Skype, Facebook, etc.) The identified application is used to mark the IP traffic. SD-WAN router 120 may mark the IP traffic with a differentiated services code point (DSCP) value. The marking may be used by SD-WAN router 120 to determine a suitable WAN link 160 for the IP traffic to transit in WAN 110b. For example, SD-WAN router 120 may determine to send IP traffic associated with higher priority applications (e.g., production traffic) through WAN link 160a that is known to be more stable than WAN link 160b. As another example, SD-WAN router 120 may determine to send IP traffic associated with lower priority applications (e.g., web browsing traffic) through WAN 160b that is lower cost than WAN link 160a. IP traffic exits SD-WAN router 120 on WAN 110b side of network 110 along the selected WAN link 160 and travels to the intended WAN services 170.

In certain embodiments, the traffic on LAN 110a side of network 110 may originate from non-IP traffic sources 140. Non-IP traffic sources 140 include any sources that generate non-IP traffic. Non-IP traffic 140 is network traffic that is not based on the IP (TCP/IP) protocol. Non-IP traffic sources 130 may be associated with one or more TDM interfaces, FXS interfaces, FXO interfaces, T1 interfaces, E1 interfaces, DSP interfaces, and the like. Non-IP traffic sources 140 may be associated with one or more legacy networks. Legacy networks may include phone, video, digital signals, and other non-IP networks.

SD-WAN router 120 of system 100 can only receive IP traffic as an input. To support unified communications, prior to non-IP traffic 140 reaching SD-WAN router 120, the non-IP traffic is transformed to IP traffic in a separate router 150. In certain embodiments, router 150 is a terminal adapter. Router 150 may be provided by a different vendor than the vendor associated with SD-WAN router 120. Router 150 communicates the transformed IP traffic (former non-IP traffic) to SD-WAN router 120, where SD-WAN router 150 performs the same techniques of NBAR and SD-WAN routing for the transformed IP traffic. Thus, while SD-WAN router 120 of system 100 applies SD-WAN policies to incoming IP traffic, an additional router 150 (and potentially an additional vendor) is required to transform non-IP traffic to IP traffic prior to the non-IP traffic entering SD-WAN router 120.

Although FIG. 1 illustrates a particular arrangement of network 110, SD-WAN router 120, IP traffic sources 130, non-IP traffic sources 140, router 150, WAN links 160, and WAN services 170, this disclosure contemplates any suitable arrangement of network 110, SD-WAN router 120, IP traffic sources 130, non-IP traffic sources 140, router 150, WAN links 160, and WAN services 170. Although FIG. 1 illustrates a particular number of networks 110, SD-WAN routers 120, IP traffic sources 130, non-IP traffic sources 140, routers 150, WAN links 160, and services 170, this disclosure contemplates any suitable number of networks 110, SD-WAN routers 120, IP traffic sources 130, non-IP traffic sources 140, routers 150, WAN links 160, and WAN services 170. For example, system 100 may include more than two WAN links 160 (and associated services 170).

FIG. 2 illustrates an example system 200 for applying SD-WAN policies to router-generated traffic. System 200 or portions thereof may be associated with an entity, which may include any entity, such as a business or company (e.g., a service provider) that applies SD-WAN policies to router-generated traffic. The components of system 200 may include any suitable combination of hardware, firmware, and software. For example, the components of system 200 may use one or more elements of the computer system of FIG. 4. System 200 includes network 210, SD-WAN router 220, IP traffic sources 230, non-IP traffic sources 240, WAN links 260, and WAN services 270.

Network 210 of system 200 facilitates communication between components of system 200. For example, network 210 of system 200 may connect one or more components (e.g., SD-WAN router 220, IP traffic sources 230, non-IP traffic sources 240, and WAN services 270) of system 200. Network 210 includes a LAN 210a and a WAN 210b. LAN 210a includes IP traffic sources 230 and non-IP traffic sources 240. WAN 210b includes WAN links 260 and WAN services 270. LAN 210a and/or WAN 210b may include one or more branch offices, data centers, corporate offices, and the like. WAN links 260 (e.g., WAN link 260a and WAN link 260b) are connections between SD-WAN router 220 and WAN services 270. WAN services 270 (e.g., WAN services 170a and WAN services 170b) may be associated with one or more applications that provide services to users (e.g., subscribers) such as video streaming, load balancing, security, retail, social media, telecommunication, gaming, banking, and the like.

While FIG. 2 illustrates certain types of networks 210, this disclosure contemplates any suitable network 210. One or more portions of network 210 may include an ad-hoc network, an intranet, an extranet, a VPN, a WLAN) a WWAN, a MAN, a portion of the Internet, a portion of the PSTN, an LTE network, a cellular telephone network, a combination of two or more of these, or other suitable types of networks 210. One or more portions of network 210 may be a communications network, such as a private network, a public network, a connection through Internet, a mobile network, a WI-FI network, a cloud network, etc. Network 210 may include a core network (e.g., a 4G and/or 5G network), an access network, an edge network, an ISP network, an NSP network, an aggregation network, and the like. Network 210 implements SD-WAN technology.

SD-WAN router 220 of system 200 is a network component that analyzes data being sent across network 210, determines routes for the data to travel network 210 based on the analysis, and communicates the data in accordance with the determined routes. SD-WAN router 220 is used to connect multiple networks together (e.g., LAN 210a and WAN 210b). SD-WAN router 220 may be a virtual router or a physical router. In the illustrated embodiment of FIG. 2, SD-WAN router 220 is a branch router. SD-WAN router 220 of system 200 receives traffic from LAN 210a and determine an appropriate path through WAN 210b to route the incoming traffic. SD-WAN router 220 separates the services side (e.g., LAN 210a) from the transport side (e.g., WAN 210b) of network 210. The services side of network 210 includes all services providing input traffic to SD-WAN router 220. The transport side includes the SD-WAN and various associated links (e.g., WAN links 160).

In certain embodiments, SD-WAN router 220 of system 200 receives IP traffic from IP traffic sources 230. IP traffic sources 230 include any sources that generate IP traffic. IP traffic sources 230 may include devices such as phones (e.g., smartphones), laptop computers, desktop computers, tablets, personal digital assistants, wearables (e.g., smartwatches, fitness trackers, etc.), and the like. IP traffic sources 230 may include one or more applications. The applications may include word processing software, spreadsheet software, presentation software, production software, database software, time management software, multimedia software, enterprise software, simulation software, educational software, content access software, web browser software, and the like. IP traffic sources 230 generate IP traffic that is forwarded to SD-WAN router 220.

In some embodiments, SD-WAN router 220 of system 200 receives non-IP traffic from non-IP traffic sources 240. Non-IP traffic sources 240 include any sources that generate non-IP traffic. Non-IP traffic sources 240 may be associated with one or more TDM interfaces, FXS interfaces, FXO interfaces, T1 interfaces, E1 interfaces, DSP interfaces, and the like. Non-IP traffic sources 240 may be associated with one or more legacy networks. Legacy networks may include phone, video, digital signals, and other non-IP networks.

SD-WAN router 220 may receive the non-IP traffic in accordance with a protocol of a legacy network. Native services (e.g., services associated with TDM, FXS, FXO, T1, E1, DSP, etc.) executing within SD-WAN router 220 of system 200 manage incoming IP traffic and/or non-IP traffic as required to facilitate transport of the traffic across WAN 110b. SD-WAN router 220 applies SD-WAN policies to the incoming IP traffic and/or non-IP traffic. SD-WAN policies are used to influence the flow of traffic among WAN links 160. SD-WAN policies may include topology policies, traffic flow policies, locally significant policies, and the like. SD-WAN policies may be associated with FEC, AppQoE, or any other suitable SD-WAN policy. FEC is a technique that is used to control errors in data transmission over unreliable or noisy communication channels. FEC may be used to recover lost packets on WAN links 160 by sending extra "parity" packets for every pre-defined group of packets (e.g., four packets). FEC may allow application performance to be preserved without the retransmission of application data. AppQoE is a technique that is used to monitor class-ofservice parameters and service-level agreement (SLA) compliance of application traffic to ensure that application data is sent over the most SLA-compliant WAN link 160 available. SD-WAN router 220 routes the incoming traffic to WAN 210b according to one or more SD-WAN policies.

SD-WAN router 220 may determine whether to terminate certain incoming traffic. In certain embodiments, SD-WAN router 220 terminates non-IP traffic received from non-IP traffic sources 140. SD-WAN router 220 may terminate the non-IP traffic using a TDM interface card (e.g., FXS, FXO, T1, E1, etc.) and a DSP that is natively available inside SD-WAN router 220. SD-WAN router 220 re-originates the incoming non-IP traffic as IP traffic, which allows SD-WAN router 220 to apply SD-WAN policies (e.g., FEC and AppQoE policies) to the former non-IP traffic. For example, the TDM interface card with DSP may convert the terminated non-IP traffic to IP packets. SD-WAN router 220 may then use any available voice over IP (VoIP) protocol (e.g., SIP, RTP, RTCP, etc.) to initiate signaling to the IP endpoints on the WAN services side of network 110. Once the call is established, one or more SD-WAN protocols (e.g., RTP and RTCP) may be used for packetized audio. SD-WAN router 220 then routes the re-originated IP traffic to WAN 210b according to the SD-WAN policies.

In some embodiments, SD-WAN router 220 may terminate incoming IP traffic received from IP traffic sources 130b that generate audio/video IP traffic. For example, SD-WAN router 220 may terminate incoming SBC IP traffic. SBC IP traffic is IP traffic that is intended for SBC functionality. SBC is a network function that enables direct IP-to-IP interconnect between multiple administrative domains for session-based services providing protocol interworking, security, and/or admission control and management. SBC may protect VoIP networks. In certain embodiments, SD-WAN router 220 re-originates the terminated SBC IP traffic according to an appropriate SD-WAN protocol (e.g., SIP, RTP, RTCP, etc.) such that the re-originated SBC IP traffic is compatible with SBC functionality. SD-WAN router 220 may then perform SBC functionality on the re-originated SBC IP traffic and route the re-originated SBC IP traffic to WAN 210b according to one or more SD-WAN policies. As such, incoming traffic from LAN 210a to SD-WAN router 220 may be IP traffic or non-IP traffic, but outgoing traffic from SD-WAN router 220 to WAN 210b is IP traffic.

In certain embodiments, SD-WAN router 220 may terminate incoming SBC IP traffic using its own VoIP stack (e.g., SIP). SD-WAN router 220 may then parse all the signaling of the terminated SBC IP traffic, understand and apply voice signaling and media specific policies to the terminated SBC IP traffic, and re-originate the terminated SBC IP traffic with the WAN IP of SD-WAN router 220. SD-WAN router 220 may communicate the re-originated SBC IP traffic to the VoIP domain on the WAN services side of network 110. If media policies require a change of codec, the VoIP stack on SD-WAN router 220 may invoke a DSP on-demand before re-originating a session and sending the re-originated SBC IP traffic to the WAN services side of network 110.

Native services operating on SD-WAN router 220 may receive and manage incoming traffic and prepare the traffic to be transported on WAN 210b. Native services may include one or more of the following services: performing SBC functions for voice and/or video traffic, performing audio/video codec transcoding and/or transrating functions, utilizing NBAR to identify an application associated with the incoming traffic, utilizing NBAR to identify an application that generated the incoming traffic, and the like. The identified application may be used to mark the IP traffic with a value (e.g., a DSCP value). The marking is used by SD-WAN router 220 to identity a suitable WAN link 160 for the IP traffic to use in WAN 210b. In some embodiments, SD-WAN router 220 may treat incoming IP traffic as pass-through traffic and apply SD-WAN policies to the IP traffic without significantly altering the flow.

Native services for non-IP traffic may be associated with FXS, FXO, T1, E1, DSP, and the like. After performing any necessary services, SD-WAN router 220 terminates the non-IP traffic and re-originates the non-IP traffic as IP traffic so that it may be transported on the SD-WAN. As such, SD-WAN router 220 of system 200 performs the functions of SD-WAN router 120 and router 150 of system 100 in a single router, which may eliminate the need for third-party technology. SD-WAN router 220 natively supports unified communications. For example, SD-WAN router 220 may act as an IP-private branch exchange (PBX), connecting calls from legacy phones to an IP network with certain features (e.g., voicemail).

In certain embodiments, SD-WAN router 220 receives IP traffic from WAN 210b to be routed to LAN 210a (e.g., a legacy network) as non-IP traffic. For example, SD-WAN router 220 may receive IP traffic from WAN 210b according to one or more SD-WAN protocols (e.g., SIP, RTP, RTCP, etc.). SD-WAN router 220 terminates the IP traffic and re-originates the IP traffic as non-IP traffic according to a protocol of the legacy network (e.g., FXS, FXO, T1, E1, DSP, etc.). SD-WAN router 220 may terminate the IP traffic using a TDM interface card (e.g., FXS, FXO, T1, E1, etc.) and a DSP that is natively available inside SD-WAN router 220. The TDM interface card with DSP may convert the terminated IP traffic to non-IP packets. SD-WAN router 220 communicates the re-originated non-IP traffic to LAN 210a of network 110.

In some embodiments, SD-WAN router 220 may generate its own traffic that is not directly correlated to incoming IP or non-IP traffic. The router-generated traffic may be treated similar to other traffic on the SD-WAN. For example, SD-WAN router 220 may apply appropriate SD-WAN policies (FEC, AppQoE, etc.) to the router-generated traffic, identify an appropriate WAN link 260 to transport the router-generated traffic to WAN services 170, and communicate the router-generated traffic along the selected WAN link 260 to the corresponding WAN service 270. As such, SD-WAN router 220 applies SD-WAN policies (e.g., FEC and AppQoE) to traffic as the traffic is transported on the SD-WAN, regardless of whether the traffic enters SD-WAN router 220 as IP traffic, enters SD-WAN router 220 as non-IP traffic, or is generated by SD-WAN router 220.

In operation, SD-WAN router 220 of network 210 receives IP traffic not intended for SBC from IP traffic source 230a, receives SBC IP traffic intended for SBC from IP traffic source 230b, and receives non-IP traffic from non-IP traffic source 240. SD-WAN router 220 terminates the SBC IP traffic and the non-IP traffic. SD-WAN router 220 re-originates the SBC IP traffic and the non-IP traffic as IP traffic in accordance with one or more SD-WAN protocols. SD-WAN router 220 also generates its own IP traffic that is not directly correlated to the incoming traffic. SD-WAN router 220 communicates the IP traffic (including the re-originated SBC IP traffic, the re-originated non-IP traffic, and the router-generated traffic) to SD-WAN links 160 in accordance with one or more SD-WAN policies. As such, SD-WAN router 220 of system 200 applies SD-WAN policies to all outgoing traffic regardless of the traffic's origination (e.g., IP, non-IP, or router-generated).

Although FIG. 2 illustrates a particular arrangement of network 210, SD-WAN router 220, IP traffic sources 230, non-IP traffic sources 240, WAN links 260, and WAN services 270, this disclosure contemplates any suitable arrangement of network 210, SD-WAN router 220, IP traffic sources 230, non-IP traffic sources 240, WAN links 260, and WAN services 270. For example, in certain embodiments, IP traffic may flow in the opposite direction than illustrated by the arrows in FIG. 2.

Although FIG. 2 illustrates a particular number of networks 210, SD-WAN routers 220, IP traffic sources 230, non-IP traffic sources 240, WAN links 260, and WAN services 270, this disclosure contemplates any suitable number of networks 210, SD-WAN routers 120, IP traffic sources 230, non-IP traffic sources 240, WAN links 260, and WAN services 270. For example, system 200 may include more than two WAN links 260 (and associated services 270).

FIG. 3 illustrates an example method 300 for applying SD-WAN policies to router-generated traffic. Method 300 begins at step 310. At step 320, an SD-WAN router (e.g., SD-WAN router 220 of FIG. 2) receives traffic from a traffic source. For example, the SD-WAN router may receive IP traffic from an IP traffic source (e.g., IP traffic source 230a of FIG. 2). As another example, the SD-WAN router may receive SBC IP traffic from an SBC IP traffic source (e.g., SBC IP traffic source 230b of FIG. 2). As still another example, the SD-WAN router may receive IP traffic from a non-IP traffic source (e.g., non-IP traffic source 240 of FIG. 2). Method 300 then moves from step 320 to step 330.

At step 330, the SD-WAN router determines whether the traffic received from the traffic source is non-IP traffic. If the SD-WAN router determines that the traffic received from the traffic source is non-IP traffic, method 300 advances from step 330 to step 350, where the SD-WAN router terminates the non-IP traffic. Method 300 then moves from step 350 to step 360, where the SD-WAN router re-originates the non-IP traffic as IP traffic in accordance with one or more SD-WAN protocols. The SD-WAN protocols may include SIP, RTP, RTCP, and the like. Method 300 then moves from step 360 to step 370, where the SD-WAN router communicates the IP traffic (i.e., re-originated non-IP traffic) to an SD-WAN link (e.g., SD-WAN link 260a or SD-WAN link 260b of FIG. 2) in accordance with one or more SD-WAN policies. The SD-WAN policies may include FEC policies, APPQoE policies, and the like. Method 300 then moves from step 370 to step 380, where method 300 ends.

If, at step 330, the SD-WAN router determines that the traffic received from the traffic source is not non-IP traffic, method 300 moves from step 330 to step 340, where the SD-WAN router determines whether the traffic received from the traffic source is SBC IP traffic. For example, the SD-WAN router may determine that certain IP traffic is intended for SBC functionality. If the SD-WAN router determines that the traffic received from the traffic source is SBC IP traffic, method 300 moves from step 340 to step 350, where the SD-WAN router terminates the SBC IP traffic. Method 300 then moves from step 350 to step 360, where the SD-WAN router re-originates the SBC IP traffic as IP traffic in accordance with one or more SD-WAN protocols. The SBC IP traffic is re-originated as IP traffic so that SD-WAN policies can be applied to the re-originated SBC IP traffic. Method 300 then moves from step 360 to step 370, where the SD-WAN router communicates the IP traffic (i.e., re-originated SBC IP traffic) to an SD-WAN link in accordance with one or more SD-WAN policies.

If, at step 340, the SD-WAN router determines that the traffic received from the traffic source is not SBC IP traffic, method 300 advances from step 340 to step 370, where the SD-WAN router treats the incoming IP traffic as passthrough traffic and communicates the IP traffic to an SD-WAN link in accordance with one or more SD-WAN policies. Method 300 then moves from step 370 to step 380, where method 300 ends. As such, method 300 applies SD-WAN policies to all outgoing traffic regardless of the traffic's origination (e.g., IP or non-IP).

Although this disclosure describes and illustrates an example method 300 for applying SD-WAN policies to router-generated traffic including the particular steps of the method of FIG. 3, this disclosure contemplates any suitable method 300 for applying SD-WAN policies to router-generated traffic, including any suitable steps, which may include all, some, or none of the steps of the method of FIG. 3, where appropriate. For example, method 300 may include additional steps directed to the SD-WAN router generating its own IP traffic that is not directly correlated to the incoming traffic and communicating the router-generated traffic to an SD-WAN link in accordance with one or more SD-WAN policies Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a LTE network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A router, comprising:
one or more processors; and
one or more computer-readable non-transitory storage media coupled to the one or more processors and comprising instructions that, when executed by the one or more processors, cause the router to perform operations comprising:

receiving first Internet Protocol (IP) traffic from one or more IP traffic sources;
identifying one or more software-defined networking in a wide area network (SD-WAN) protocols;
determining that the first IP traffic is not compatible with the one or more SD-WAN protocols; and
determining, in response to determining that the first IP traffic is not compatible with the one or more SD-WAN protocols, whether to terminate and re-originate the first IP traffic as second IP traffic in accordance with the one or more SD-WAN protocols.

2. The router of claim 1, the operations further comprising:
terminating the first IP traffic;
re-originating the first IP traffic as the second IP traffic in accordance with the one or more SD-WAN protocols;
performing Session Border Controller (SBC) functions on the second IP traffic; and
communicating the second IP traffic to an SD-WAN link in accordance with one or more SD-WAN policies.

3. The router of claim 2, wherein the one or more SD-WAN policies comprise at least one of the following:
a Forward Error Correction (FEC) policy; or
an Application Quality of Experience (APPQoE) policy.

4. The router of claim 1, the operations further comprising communicating the first IP traffic to an SD-WAN link in accordance with one or more SD-WAN policies.

5. The router of claim 1, wherein the one or more SD-WAN protocols comprise at least one of the following:
a Session Initiation Protocol (SIP);
a Real-Time Transport Protocol (RTP); or
a Real-Time Transport Control Protocol (RTCP).

6. The router of claim 1, the operations further comprising performing network-based application recognition (NBAR) to identify an application associated with the first IP traffic.

7. The router of claim 1, the operations further comprising:
terminating the first IP traffic using a voice over IP (VoIP) stack;
parsing signals of the first IP traffic;
applying voice signaling and media specific policies to the first IP traffic; and
re-originating the first IP traffic as the second IP traffic.

8. A method, comprising:
receiving first Internet Protocol (IP) traffic from one or more IP traffic sources;
identifying one or more software-defined networking in a wide area network (SD-WAN) protocols;
determining that the first IP traffic is not compatible with the one or more SD-WAN protocols; and
determining, in response to determining that the first IP traffic is not compatible with the one or more SD-WAN protocols, whether to terminate and re-originate the first IP traffic as second IP traffic in accordance with the one or more SD-WAN protocols.

9. The method of claim 8, further comprising:
terminating the first IP traffic;
re-originating the first IP traffic as the second IP traffic in accordance with the one or more SD-WAN protocols;
performing Session Border Controller (SBC) functions on the second IP traffic; and
communicating the second IP traffic to an SD-WAN link in accordance with one or more SD-WAN policies.

10. The method of claim 9, wherein the one or more SD-WAN policies comprise at least one of the following:
a Forward Error Correction (FEC) policy; or
an Application Quality of Experience (APPQoE) policy.

11. The method of claim 8, further comprising communicating the first IP traffic to an SD-WAN link in accordance with one or more SD-WAN policies.

12. The method of claim 8, wherein the one or more SD-WAN protocols comprise at least one of the following:
a Session Initiation Protocol (SIP);
a Real-Time Transport Protocol (RTP); or
a Real-Time Transport Control Protocol (RTCP).

13. The method of claim 8, further comprising performing network-based application recognition (NBAR) to identify an application associated with the first IP traffic.

14. The method of claim 8, further comprising:
terminating the first IP traffic using a voice over IP (VoIP) stack;
parsing signals of the first IP traffic;
applying voice signaling and media specific policies to the first IP traffic; and
re-originating the first IP traffic as the second IP traffic.

15. One or more computer-readable non-transitory storage media embodying instructions that, when executed by a processor, cause the processor to perform operations comprising:
receiving first Internet Protocol (IP) traffic from one or more IP traffic sources;
identifying one or more software-defined networking in a wide area network (SD-WAN) protocols;
determining that the first IP traffic is not compatible with the one or more SD-WAN protocols; and
determining, in response to determining that the first IP traffic is not compatible with the one or more SD-WAN protocols, whether to terminate and re-originate the first IP traffic as second IP traffic in accordance with the one or more SD-WAN protocols.

16. The one or more computer-readable non-transitory storage media of claim 15, the operations further comprising:
terminating the first IP traffic;
re-originating the first IP traffic as the second IP traffic in accordance with the one or more SD-WAN protocols;
performing Session Border Controller (SBC) functions on the second IP traffic; and
communicating the second IP traffic to an SD-WAN link in accordance with one or more SD-WAN policies.

17. The one or more computer-readable non-transitory storage media of claim 16, wherein the one or more SD-WAN policies comprise at least one of the following:
a Forward Error Correction (FEC) policy; or
an Application Quality of Experience (APPQoE) policy.

18. The one or more computer-readable non-transitory storage media of claim 15, the operations further comprising communicating the first IP traffic to an SD-WAN link in accordance with one or more SD-WAN policies.

19. The one or more computer-readable non-transitory storage media of claim 15, the operations further comprising:
a Session Initiation Protocol (SIP);
a Real-Time Transport Protocol (RTP); or
a Real-Time Transport Control Protocol (RTCP).

20. The one or more computer-readable non-transitory storage media of claim 15, the operations further comprising performing network-based application recognition (NBAR) to identify an application associated with the first IP traffic.

* * * * *